United States Patent
Mandal et al.

(10) Patent No.: US 12,524,687 B2
(45) Date of Patent: Jan. 13, 2026

(54) ARTIFICIAL INTELLIGENCE-BASED DECISION MANAGEMENT SYSTEM FOR APPEALS ON HEALTHCARE CLAIM DENIALS

(71) Applicant: Virtusa Corporation, Southborough, MA (US)

(72) Inventors: Alok Mandal, Ellicott City, MD (US); Anirvan Acharya, Williamsville, NY (US)

(73) Assignee: Virtusa Corporation, Southborough, MA (US)

( * ) Notice: Subject to any disclaimer, the term of this patent is extended or adjusted under 35 U.S.C. 154(b) by 1085 days.

(21) Appl. No.: 17/520,680

(22) Filed: Nov. 7, 2021

(65) Prior Publication Data

US 2023/0142392 A1  May 11, 2023

(51) Int. Cl.
*G06Q 40/08* (2012.01)
*G06N 5/04* (2023.01)

(52) U.S. Cl.
CPC .............. *G06N 5/04* (2013.01); *G06Q 40/08* (2013.01)

(58) Field of Classification Search
CPC ..................................................... G06Q 40/08
See application file for complete search history.

(56) References Cited

U.S. PATENT DOCUMENTS

2022/0044328 A1\* 2/2022 Ligon .................. G16H 10/60

\* cited by examiner

*Primary Examiner* — Edward Chang
(74) *Attorney, Agent, or Firm* — Danielson Legal LLC (57) ABSTRACT

An artificial intelligence-based decision management system for appeals on healthcare claim denials is disclosed. The plurality of subsystems includes a dataset creation subsystem. The dataset creation subsystem is also configured to determine a plurality of claim predictors corresponding to the one or more context parameters and also configured to create a unique dataset for each of the determined plurality of claim predictors based on values of the one or more context parameters. The plurality of subsystems includes a claim approval propensity prediction subsystem, configured to validate the received appeal by applying the created unique dataset and pre-stored business rules, pre-stored predictive models and pre-stored adaptive models on to a trained artificial intelligence decisioning model and configured to predict claim approval propensity for the appeal based on output of the trained artificial intelligence decisioning model. The data driven decisions clearly increases the correct prediction of claims.

19 Claims, 4 Drawing Sheets

ARTIFICIAL INTELLIGENCE-BASED DECISION MANAGEMENT SYSTEM FOR APPEALS ON HEALTHCARE CLAIM DENIALS

FIELD OF INVENTION

Embodiments of the present disclosure relates to an artificial intelligence-based computing systems, and more particularly to an artificial intelligence-based decision management system for appeals on healthcare claim denials.

BACKGROUND

Typically, a healthcare claim involves multistage approvals from authorized personnel and decision-making steps in order to process the healthcare claim. In such decision-making steps, usually a medical expert is required to make a number of real time decisions on the healthcare claim for benefit of a customer or hospital. Such real time decisions tend to become a bottleneck in cases of appeals and grievances. Further, the medical expert has to familiarize with new regulations that are designed specifically for calculation of the healthcare claims.

In existing systems, the real time decisions on the healthcare claim are taken manually. Such manual real time decisions are resource and time intensive and also consume substantial amount of time for going through details regarding previous types of cases with similar decisions. Such existing systems are inefficient and are often unable to process the healthcare claims accurately due to multiple factors such as incomplete or incorrect verification, incomplete information and unavailability of data.

In most of the cases, the medical experts involve and resolve medical claim grievances in real time. In order to resolve such medical claim grievances, the medical experts are required to comply with many regulations and possibilities. In such scenarios, failure to adhere to such regulations while resolving the medical grievances may lead to penalties. The existing systems also fails to take into account the new regulations that are updated regularly for the benefit of the customer.

Hence, there is a need for an artificial intelligence-based decision management system for appeals on healthcare claim denials and a method to operate the same and therefore address the aforementioned issues.

BRIEF DESCRIPTION

In accordance with one embodiment of the disclosure, an artificial intelligence-based decision management system for appeals on healthcare claim denials is disclosed. The decision management system includes a hardware processor. The management system also includes a memory coupled to the hardware processor. The memory comprises a set of program instructions in the form of a plurality of subsystems, configured to be executed by the hardware processor.

The plurality of subsystems includes an appeal generation subsystem. The appeal generation subsystem is configured to receive an appeal on healthcare claim denial from a customer. The plurality of subsystems also includes a dataset creation subsystem. The dataset creation subsystem is also configured to determine a plurality of claim predictors corresponding to the one or more context parameters comprised in the received appeal using an artificial intelligence-based predictor model. The dataset creation subsystem is also configured to create a unique dataset for each of the determined plurality of claim predictors based on values of the one or more context parameters.

The plurality of subsystems also includes a claim approval propensity prediction subsystem. The claim approval propensity prediction subsystem is configured to validate the received appeal by applying the created unique dataset and pre-stored business rules, pre-stored predictive models and pre-stored adaptive models on to a trained artificial intelligence decisioning model. The claim approval propensity prediction subsystem is also configured to predict claim approval propensity for the appeal based on output of the trained artificial intelligence decisioning model. The plurality of subsystems also includes an output subsystem. The output subsystem is configured to output the predicted claim approval propensity for the appeal on a user interface of a user device.

In accordance with one embodiment of the disclosure, a method for operating an artificial intelligence-based decision management system for appeals on healthcare claim denials is disclosed. The method includes receiving an appeal on healthcare claim denials from a customer. The method also includes determining a plurality of claim predictors corresponding to the one or more context parameters comprised in the received appeal using an artificial intelligence-based predictor model.

The method also includes creating a unique dataset for each of the determined plurality of claim predictors based on values of the one or more context parameters. The method also includes validating the received appeal by applying the created unique dataset and pre-stored business rules, pre-stored predictive models and pre-stored adaptive models on to a trained artificial intelligence decisioning model. The method also includes predicting claim approval propensity for the appeal based on output of the trained artificial intelligence decisioning model. The method also includes outputting the predicted claim approval propensity for the appeal on a user interface of a user device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

Figure 1:
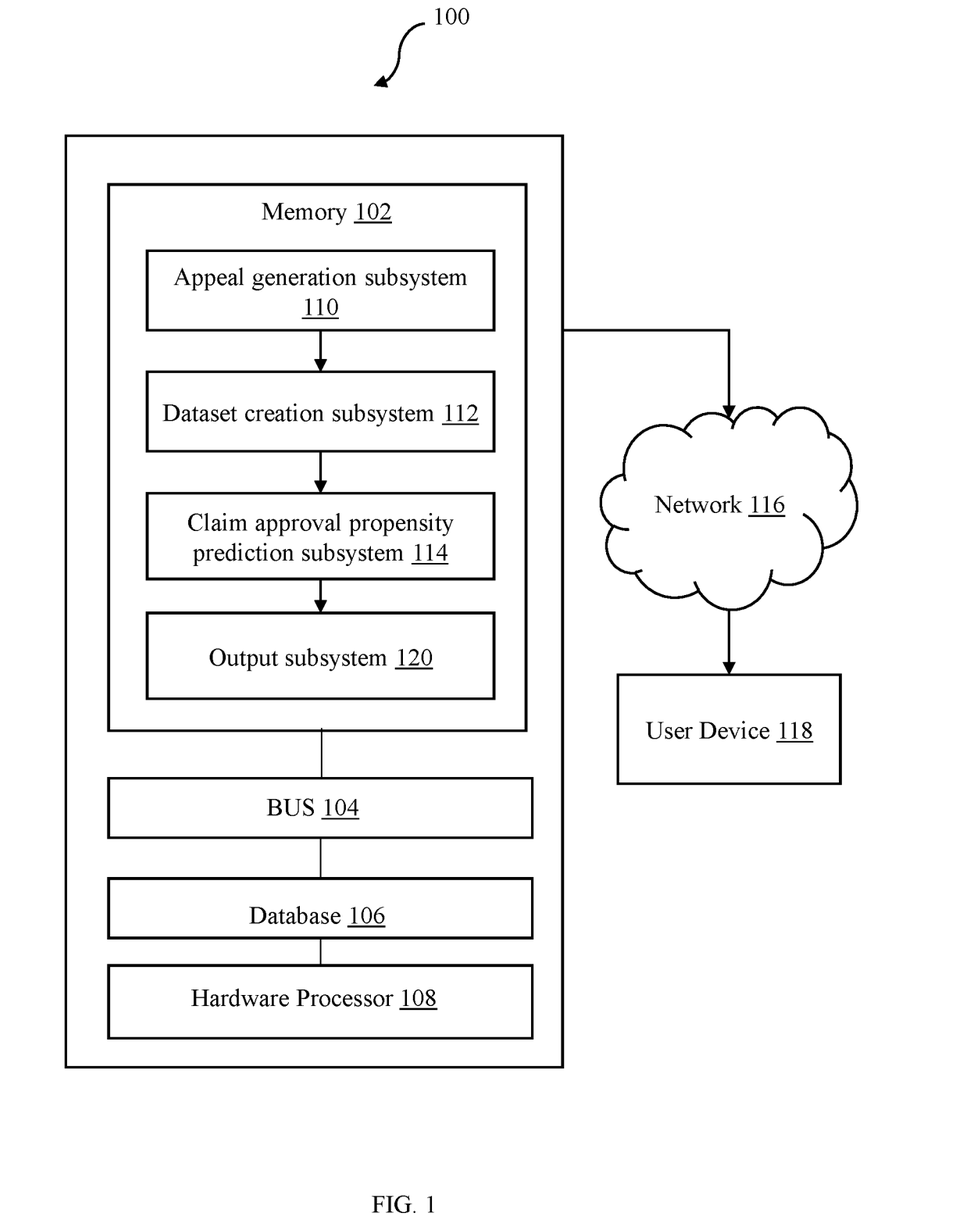
FIG. 1 is a block diagram illustrating an exemplary artificial intelligence-based decision management system for appeals on healthcare claim denials in accordance with an embodiment of the present disclosure.

FIG. 1 is a block diagram illustrating an exemplary artificial intelligence-based decision management system 100 for appeals on healthcare claim denials in accordance with an embodiment of the present disclosure.

In a highly regulated healthcare industry, providing timely and accurate medical claim resolutions to member grievances by complying with Computer Management System (CMS) guidelines and business Service Level Agreements (SLAs) is always a complex and manual-intensive effort. In an embodiment, the management system 100 may be a remote server, an edge device, a user device, a cloud server and the like.

The management system 100 includes a hardware processor 108. The management system 100 also includes a memory 102 coupled to the hardware processor 108. The memory 102 comprises a set of program instructions in the form of a plurality of subsystems, configured to be executed by the hardware processor 108.

The hardware processor(s) 108, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 102 includes a plurality of subsystems stored in the form of executable program which instructs the hardware processor 108 via a bus 104 to perform the method steps. The plurality of subsystems has following subsystems: an appeal generation subsystem 110, a dataset creation subsystem 112, a claim approval propensity prediction subsystem 114 and an output subsystem 120.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 108.

Although, FIG. 1 illustrates the management system 100 connected to one user device 118, one skilled in the art can envision that the management system 100 can be connected to several user devices 118 located at different locations via the network 116. In an embodiment, a web application may be hosted on a remote web server from where it is loaded on a "web browser" on the user device 118. In such case, the management system 100 may be a remote web server.

The plurality of subsystems includes an appeal generation subsystem 110. The appeal generation subsystem 110 is configured to receive an appeal on healthcare claim denial from a customer. In one embodiment, the appeal comprises one or more context parameters. In another embodiment, the one or more context parameters include data representative of business issue, group, name, direction, channel, procedure code and procedure code type. In such embodiment, the customer may be a medical expert such as a nurse or any medical officer.

In one exemplary embodiment, the management system 100 for a particular medical claim case, first receives one or more context parameters. In such exemplary embodiment, the one or more context parameters may include all necessary details regarding the appeal such as data representative of name, direction, channel, procedure code, procedure code type and the like.

In one specific exemplary embodiment, the managing system 100 may collect the received one or more context parameters from a document or through typed text as provided in real time. In such embodiment, the managing system 100 understands the provided document data through application of optical character recognition technique.

The plurality of subsystems also includes a dataset creation subsystem 112. The dataset creation subsystem 112 is configured to determine a plurality of claim predictors corresponding to the one or more context parameters comprised in the received appeal using an artificial intelligence-based predictor model. The plurality of claim predictors comprises a predictor name and predictor type and the artificial intelligence-based predictor model represents the plurality of claim predictors.

In one such embodiment, the predictor names corresponding to plurality of claim predictors include medical plan name, medical plan type, medical plan line of balance, medical diagnosis code, medical coinsurance amount, medical procedure approved amount, medical procedure charge amount, co-payment amount, medical deductible amount, noncovered charges, and the like. In another such embodiment, the predictor types corresponding to plurality of claim predictors include symbolic predictor or numeric predictor.

In the above stated exemplary embodiment, after the entry of one or more context parameters corresponding to the medical claim case request, the dataset creation subsystem determines a plurality of claim predictors. Details of the medical plan name, the medical plan type, the medical plan line of balance, the medical diagnosis code, the medical coinsurance amount, the medical procedure approved amount, the medical procedure charge amount, the co-payment amount, the medical deductible amount and the medical noncovered charges are determined from pre-stored details. In another embodiment, the details of the medical plan name, the medical plan type, the medical plan line of balance, the medical diagnosis code, the medical coinsurance amount, the medical procedure approved amount, the medical procedure charge amount, the medical co-payment amount, the medical deductible amount and noncovered charges may also be manually inputted.

The dataset creation subsystem 112 is also configured to create a unique dataset for each of the determined plurality of claim predictors based on values of the one or more context parameters. In one embodiment, such determination is essential for decision analysis by the computing system 100.

For example, a medical claim case regarding a cancer operation has one or more context parameters such as cancer operation code, cancer operation name and the like. The determined plurality of claim predictors includes the cancer operation plan name, cancer operation plan type, cancer diagnosis code, cancer operation coinsurance amount, cancer operation procedure approved amount, cancer operation procedure charge amount, co-payment amount, deductible amount, noncovered charges and the like. In such embodiment, a unique dataset is created for each of the determined plurality of claim predictors of the cancer operation based on values of the collected one or more context parameters. Such unique dataset is essentially stored in a database 106 and used for analysis.

The plurality of subsystems also includes a claim approval propensity prediction subsystem 114. The claim approval propensity prediction subsystem 114 is configured to validate the received appeal by applying the created unique dataset and pre-stored business rules, pre-stored predictive models and pre-stored adaptive models on to trained artificial intelligence decisioning model. In one specific embodiment, the pre-stored business rules, the pre-stored predictive models and the pre-stored adaptive models are derived from earlier known case appeals and earlier known decision rationales.

In one embodiment, to validate the received appeal, the clinical data analysing subsystem 114 is configured to generate a trained artificial intelligence decisioning model based on an input claim training dataset, the pre-stored business rules, the pre-stored predictive models and the pre-stored adaptive models. Further, the clinical data analysing subsystem 114 is also configured to dynamically corelate the one or more context parameters of the appeal and the created unique dataset with the pre-stored business rules, the pre-stored predictive models and the pre-stored adaptive models of the generated trained artificial intelligence decisioning model. In such embodiment, correlation means matching of parameters corresponding to earlier known case appeals and earlier known decision rationales with the collected one or more context parameters of the case and the created unique dataset.

The claim approval propensity prediction subsystem 114 is also configured to predict claim approval propensity for the appeal based on output of the trained artificial intelligence decisioning model. In one embodiment, to predict approval propensity, the clinical data analysing subsystem 114 is configured to determine whether the one or more context parameter matches with at least one of the created unique dataset and the pre-stored business rules, the pre-stored predictive models and the pre-stored adaptive models. The claim approval propensity represents at least one of: an approval probability score and a rejection probability score for the appeal.

After matching, the clinical data analysing subsystem 114 determines deviation in the one or more context parameter if the one or more context parameter fails to match with the at least one of the created unique dataset and the pre-stored business rules, the pre-stored predictive models and the pre-stored adaptive models. The clinical data analysing subsystem 114 generates at least one of an approval propensity score and a rejection probability score for the appeal based on the determined deviation. Further, the clinical data analysing subsystem 114 predicts the claim approval propensity for the appeal based on the generated at least one of the approval propensity scores and the rejection probability score.

The management system 100 through the claim approval propensity prediction subsystem 114 checks on the deviation of the collected one or more context parameter from the at least one of the created unique dataset and the pre-stored business rules, the pre-stored predictive models and the pre-stored adaptive models. In such embodiment, depending on the deviation the claim approval propensity prediction subsystem outputs the approval propensity for the appeal.

In one embodiment, if the claim approval propensity prediction subsystem 114 predicts positive approval propensity score, the medical experts may go ahead with real time clinical decisions. In another embodiment, if the claim approval propensity prediction subsystem 114 predicts negative approval propensity score, the medical experts may have to again decide claim decisions for the fear of successful appeals by a medical patient. Simultaneously, the rejection probability score is generated for the appeal. The medical experts include nurses, medical officers and the like.

The plurality of subsystems also includes an output subsystem 120. The output subsystem 120 is configured to output the predicted claim approval propensity for the appeal on a user interface of a user device 118.

The plurality of subsystems further includes a recommendation subsystem. The recommendation subsystem is configured to generate recommendation messages for the predicted approval propensity. The recommendation messages are intended for the medical expert. The recommendation subsystem prompts the recommendation messages at different stages of the appeal to the medical expert. The recommendation messages comprise one or more suggestions for processing the appeal.

The plurality of subsystem also includes a claim summary subsystem. The claim summary subsystem is configured to generate an appeal summary for the appeal based on the predicted claim approval propensity. The appeal summary comprises insights derived based on the approval probability score and a rejection probability score for the appeal. In one embodiment, for negative approval propensity score, the appeal summary may provide details of penalties and details of decisions taken by a legal court during a similar appeal.

The plurality of subsystem also includes a training subsystem. The training subsystem is configured to self-learn the trained artificial intelligence decisioning model based on the predicted claim approval propensity. The training subsystem is also configured to auto correct propensities of approval of the appeal based on the self-learnt artificial intelligence decisioning model. In one embodiment, features like the self-learning and the autocorrection helps the management system 100 in making an easy and a flawless fast decision.

The plurality of subsystem also includes a backward trace subsystem. The backward trace subsystem is configured to backward trace of the predicted claim approval propensity for the appeal to determine prediction rationale.

Figure 2:
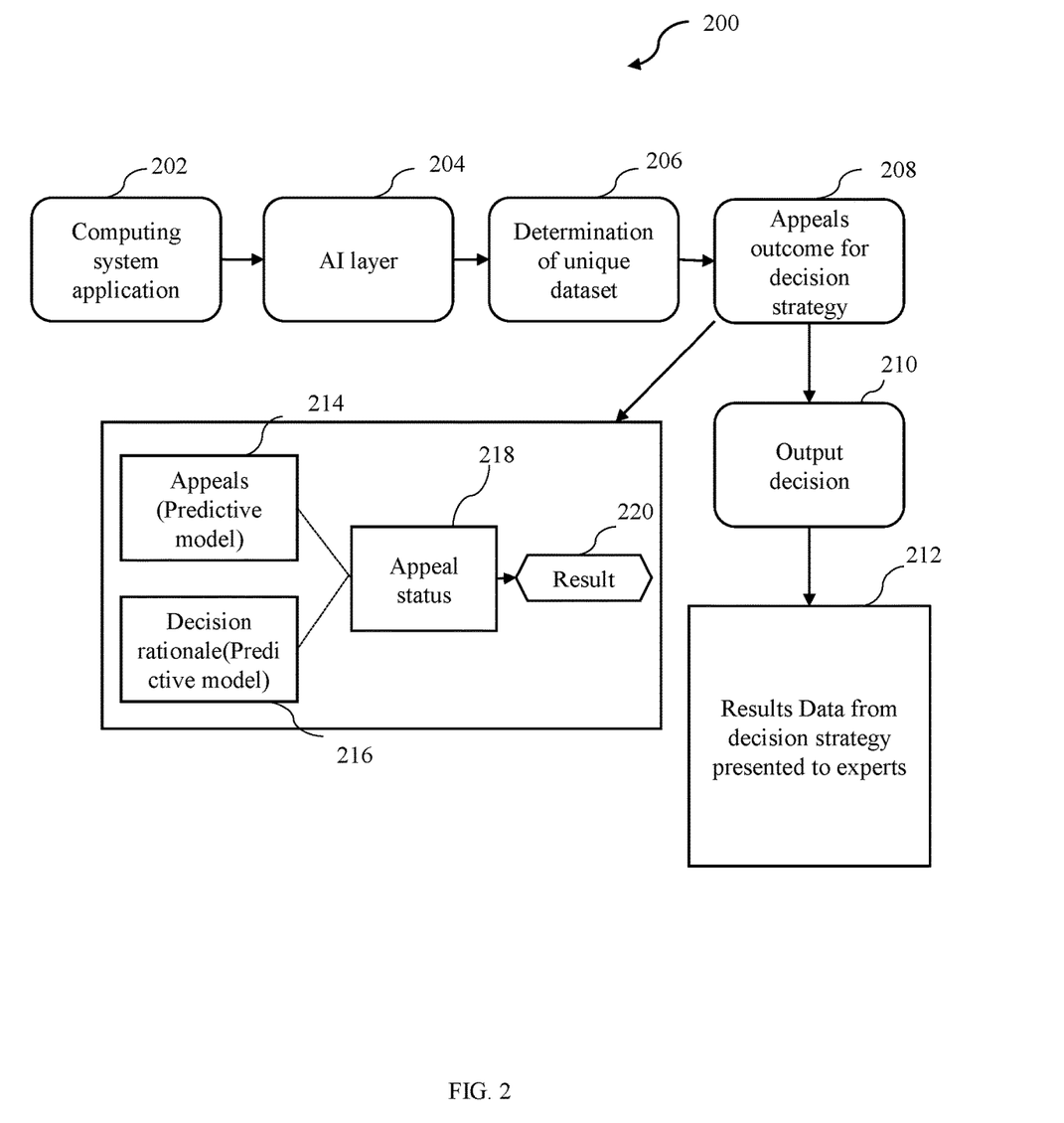
FIG. 2 is a flowchart illustrating another exemplary process flow for approval propensity outcome by using artificial intelligence models in accordance with an embodiment of the present disclosure.

FIG. 2 is a flowchart illustrating another exemplary process flow 200 for approval propensity outcome by using artificial intelligence models in accordance with an embodiment of the present disclosure. Medical experts like nurses and medical officers make a number of real time medical claim decisions. The process flow 200 enables the medical experts to predict whether an appeal for such claim decision will be overturned or upheld.

At step 202, the application corresponding to the management system 100 receives a current case parameter from the medical experts. The current case parameters include the one or more context parameters. At step 204, the received input of the one or more context parameters is stored in abstract format before usage in an AI layer.

Before prediction, the dataset creation subsystem 112 determines a plurality of claim predictors corresponding to the one or more context parameters of the appeal. At step 206, a unique dataset is created for each of the determined plurality of claim predictors based on values of the received one or more context parameters. Such creation enables the management system 100 for matching and predicting the approval propensity score. In such embodiment, the created unique dataset is a useable format for analysing and prediction by the management system 100.

At step 208, the created unique dataset and the pre-stored business rules, the pre-stored predictive models and the pre-stored adaptive models is applied on to the trained artificial intelligence decisioning model. The trained artificial intelligence decisioning model predicts approval propensity score for the appeal. For approvable, the pre-stored predictive model includes data from previous appeal case 214 and previous decision rationale 216. Appeal status 218 is calculated from such data and presented as result 220.

At step 210, output decision regarding the prediction is generated. At step 212, the output results as decisions are presented to the medical experts like nurses and medical offices.

Figure 3:
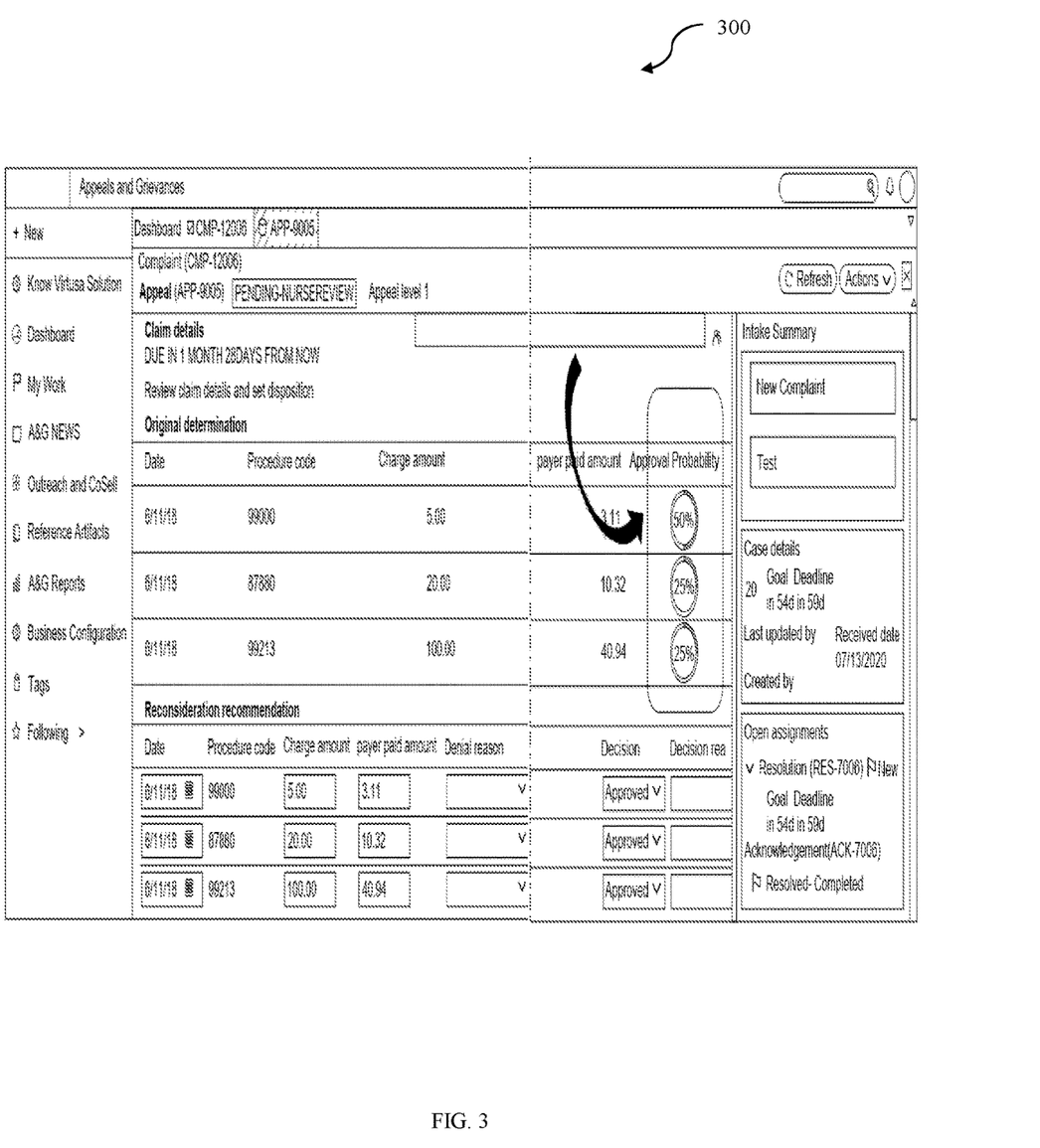
FIG. 3 is snapshot view of an exemplary dashboard corresponding to the artificial intelligence-based decision management system for appeals on healthcare claim denials, such as those shown in FIG. 1 in accordance with an embodiment of the present disclosure.

FIG. 3 is snapshot 300 view of an exemplary dashboard corresponding to the artificial intelligence-based decision management system for appeals on healthcare claim denials, such as those shown in FIG. 1 in accordance with an embodiment of the present disclosure. The exemplary dashboard clearly shows the plurality of claim predictors, the collected one or more context parameters and the approval propensity score in percentage. For a corresponding medical operation date, the approval propensity score in percentage is provided for a medical operation code.

Figure 4:
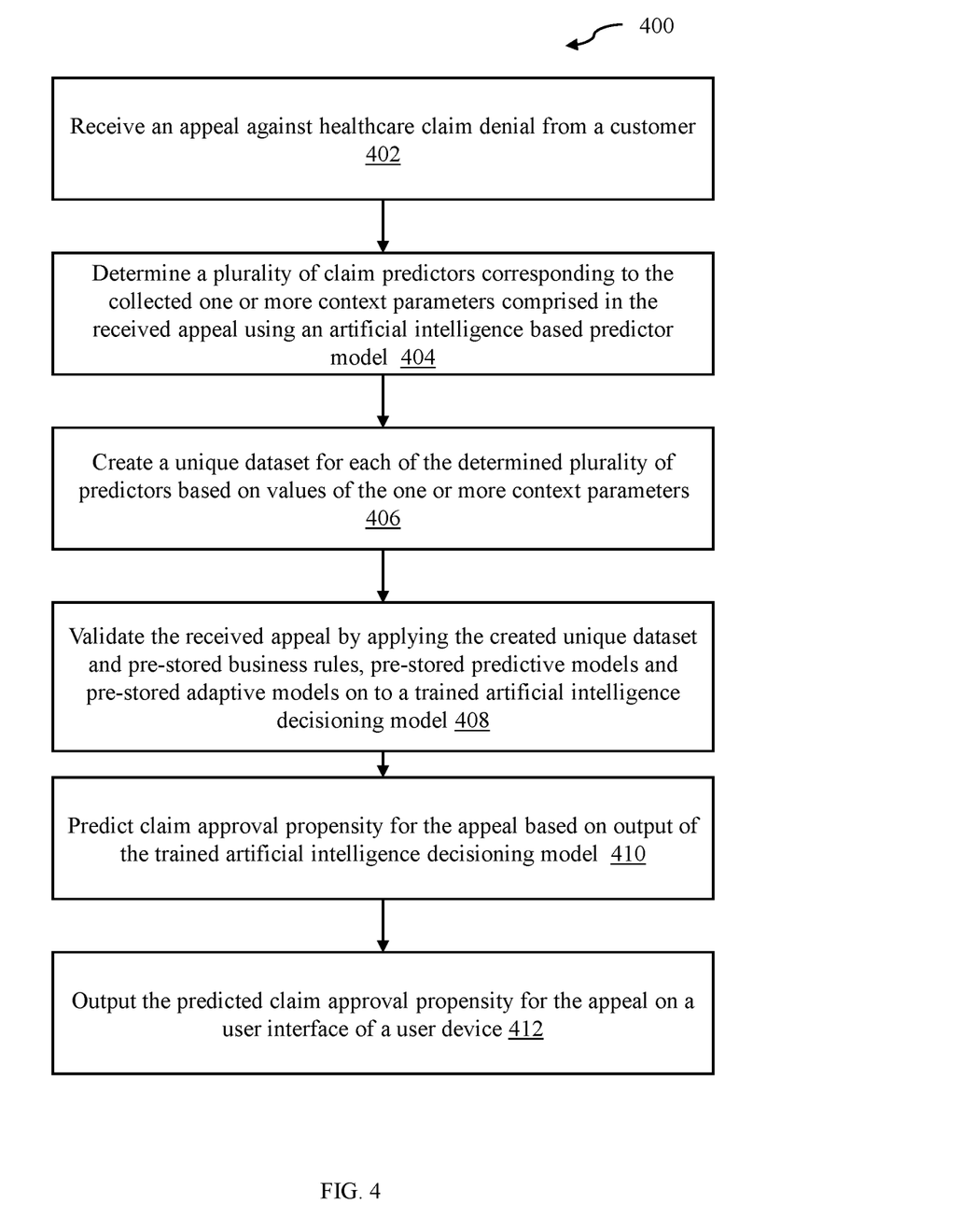
FIG. 4 is a process flowchart illustrating an exemplary method for operating an artificial intelligence-based decision management system for appeals on healthcare claim denials in accordance with an embodiment of the present disclosure.

FIG. 4 is a process flowchart illustrating an exemplary method 400 for operating artificial intelligence-based decision management system for appeals on healthcare claim denials in accordance with an embodiment of the present disclosure.

In step 402, an appeal on healthcare claim denial from a customer is received. In one aspect of the present embodiment, the appeal from the customer is received by an appeal generation subsystem 110. The healthcare claim denials are a situation where a customer had previously raised a healthcare claim request such as for reimbursing a medical claim amount or the like and such healthcare claim request was denied by the concerned authorities due to one or more reasons. In such cases, the customer raises an appeal to challenge the denial of his healthcare claim. In another aspect of the present embodiment, the appeal includes one or more context parameters. The one or more context parameters includes data representative of business issue, group, name, direction, channel, procedure code and procedure code type.

In step 404, a plurality of claim predictors is determined corresponding to the collected one or more context parameters comprised in the received appeal using an artificial intelligence-based predictor model. In one aspect of the present embodiment, the plurality of claim predictors is determined by a dataset creation subsystem 112. The plurality of predictors comprises medical plan name, medical plan type, medical plan line of balance, medical diagnosis code, medical coinsurance amount, medical procedure approved amount, medical procedure charge amount, co-payment amount, medical deductible amount, noncovered charges and the like. The plurality of claim predictors comprises a predictor name and predictor type and the artificial intelligence-based predictor model represents the plurality of claim predictors.

In step 406, a unique dataset is created for each of the determined plurality of claim predictors based on values of the one or more context parameters. In one aspect of the present embodiment, the unique dataset is created for each of the determined plurality of predictors by the dataset creation subsystem 112.

In step 408, the created unique dataset and pre-stored business rules, pre-stored predictive models and pre-stored adaptive models is validated by applying applied on to a trained artificial intelligence decisioning model. In one aspect of the present embodiment, the created unique dataset and pre-stored business rules, pre-stored predictive models and pre-stored adaptive models is validated by the claim approval propensity prediction subsystem 114.

In another aspect of the present embodiment, applying the created unique dataset, pre-stored business rules, pre-stored predictive models and pre-stored adaptive models on to a trained artificial intelligence decisioning model includes generating the trained artificial intelligence decisioning model based on an input claim training dataset, the pre-stored business rules, the pre-stored predictive models and the pre-stored adaptive models. Further, applying the created unique dataset, the pre-stored business rules, the pre-stored predictive models and the pre-stored adaptive models on to the trained artificial intelligence decisioning model includes dynamically correlating the one or more context parameters of the case and the created unique dataset with the pre-stored business rules, the pre-stored predictive models and the pre-stored adaptive models of the generated trained artificial intelligence decisioning model.

In step 410, claim approval propensity is predicted for the appeal based on output of the trained artificial intelligence decisioning model. In one aspect of the present embodiment, approval propensity is predicted for the case by the claim approval propensity prediction subsystem 114. In another aspect of the present embodiment, approval propensity is predicted for the case includes determining whether the collected one or more context parameter matches with at least one of created unique dataset and the pre-stored business rules, the pre-stored predictive models and the pre-stored adaptive models. The claim approval propensity represents at least one of: an approval probability score and a rejection probability score for the appeal.

Further, the approval propensity score is predicted by determining a deviation in the one or more context parameter if the one or more context parameter fails to match with the at least one of the created unique dataset and the pre-stored business rules, the pre-stored predictive models and the pre-stored adaptive models. Further, at least one of an approval propensity score and a rejection probability score is generated for the appeal based on the determined deviation. The claim approval propensity for the appeal is predicted based on output of the trained artificial intelligence decisioning model based on the generated at least one of the approval propensity score and the rejection probability score.

At step 112, the predicted claim is outputted on a user interface of a user device. In one aspect of the present embodiment, the predicted claim is outputted by the output subsystem.

The method 400 further comprises generating an appeal summary for the appeal based on the predicted claim approval propensity. In one aspect of the present embodiment, the appeal summary comprises insights derived based on the approval probability score and a rejection probability score for the appeal. In another aspect of the present embodiment, appeal summary for the appeal is generated by a claim summary subsystem.

The method 400 further includes self-learning the trained artificial intelligence decisioning model based on the predicted claim approval propensity. The method 400 also includes auto correcting propensities of approval of the appeal based on the self-learnt artificial intelligence decisioning model. In one aspect of the present embodiment, the self-learning and the autocorrecting is performed by a training subsystem.

The method 400 also further includes backward tracing of the predicted claim approval propensity for the appeal to determine prediction rationale. In one aspect of the present embodiment, backward tracing of the predicted claim approval propensity for the appeal to determine prediction rationale includes backward trace subsystem.

The method 400 also includes generating recommendation messages for the predicted approval propensity score. The method 400 also includes prompting presentation of the recommendation messages at different stages of the appeal to the medical expert. In one embodiment, the recommendation messages are generated and promoted by a recommendation subsystem.

Various embodiments of the present disclosure disclose an artificial intelligence-based decision management system for financial medical claims. The data driven decisions clearly increases the correct prediction of claims. The nurses and medical offices may access the decisions easily and also provide feedback if required. The artificial intelligence decision model updates every time a nurse or medical officer makes a decision on approval or denial on appeals at some level.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. An artificial intelligence-based decision management system for appeals on healthcare claim denials, the artificial intelligence-based decision management system comprising:
a remote web server configured to host a plurality of subsystems and a web application, wherein the remote web server is configured to connect to a user device via a network;
a hardware processor; and
a memory coupled to the hardware processor, wherein the memory comprises a set of program instructions in the form of the plurality of subsystems, configured to be executed by the hardware processor, wherein the plurality of subsystems comprises:
an appeal generation subsystem configured to receive an appeal on healthcare claim from a customer, wherein the appeal comprises one or more context parameters;
a dataset creation subsystem configured to:
receive the context parameters from the appeal generation subsystem;
determine a plurality of claim predictors corresponding to the one or more context parameters comprised in the received appeal using an artificial intelligence-based predictor model, wherein the plurality of claim predictors comprises a predictor name and predictor type and wherein the artificial intelligence-based predictor model represents the plurality of claim predictors; and create a dataset for each of the determined plurality of predictors based on values of the one or more context parameters; and a claim approval propensity prediction subsystem configured to:

receive the created dataset from the dataset creation subsystem;

generate a trained artificial intelligence decisioning model based on an input claim training dataset, pre-stored business rules, pre-stored predictive models and pre-stored adaptive models, wherein the trained artificial intelligence decisioning model is configured to predict claim approval propensities for appeals;

determine, using the trained artificial intelligence decisioning model, whether the one or more context parameters matches one or more parameters regarding the pre-stored business rules, the pre-stored predictive models and the pre-stored adaptive models;

predict claim approval propensity for the appeal based on output of the trained artificial intelligence decisioning model, wherein the claim approval propensity represents at least one of: an approval probability score and a rejection probability score for the appeal;

an output subsystem configured to output the predicted claim approval propensity for the appeal to the web application for display on a web browser executing on a user device; and a recommendation subsystem configured to generate at least one recommendation message for the predicted claim approval propensity, wherein the recommendation message comprises a recommendation for a medical expert to proceed with real-time clinical decisions based on a positive propensity score.

2. The artificial intelligence-based decision management system of claim 1, further comprising a claim summary subsystem configured to generate an appeal summary for the appeal based on the predicted claim approval propensity, wherein the appeal summary comprises insights derived based on the approval probability score and a rejection probability score for the appeal.

3. The artificial intelligence-based decision management system of claim 1, further comprising a training subsystem configured to:

self-learn the trained artificial intelligence decisioning model based on the predicted claim approval propensity; and auto correct propensities of approval of the appeal based on the self-learnt artificial intelligence decisioning model.

4. The artificial intelligence-based decision management system of claim 1, further comprising a backward trace subsystem configured to backward trace of the predicted claim approval propensity for the appeal to determine prediction rationale.

5. The artificial intelligence-based decision management system of claim 1, in predicting the approval propensity score, the claim approval propensity prediction subsystem is configured to:

determine a deviation in the one or more context parameter if the one or more context parameter fails to match with the at least one of the created dataset and the pre-stored business rules, the pre-stored predictive models and the pre-stored adaptive models;

generating at least one of an approval propensity score and a rejection probability score for the appeal based on the determined deviation; and predict the claim approval propensity for the appeal based on the generated at least one of the approval propensity score and the rejection probability score.

6. The artificial intelligence-based decision management system of claim 1, wherein the recommendation subsystem is further configured to present the recommendation message at different stages of the appeal.

7. The artificial intelligence-based decision management system of claim 1, wherein the one or more context parameters comprises data representative of at least one of business issue, group, name, direction, channel, procedure code and procedure code type.

8. The artificial intelligence-based decision management system of claim 1, wherein the predictor names related to the plurality of claim predictors comprises medical plan name, medical plan type, medical plan line of balance, medical diagnosis code, medical coinsurance amount, medical procedure approved amount, medical procedure charge amount, co-payment amount, deductible amount and noncovered charges.

9. The artificial intelligence-based decision management system of claim 1, wherein the predictor types related to the plurality of claim predictors comprises symbolic predictor type and numeric predictor type.

10. A method for operating artificial intelligence-based decision management system for appeals on healthcare claim denials, the method comprising:

receiving, by a processor, an appeal on a healthcare claim from a customer, wherein the appeal comprises one or more context parameters;

determining, by the processor, a plurality of claim predictors corresponding to the one or more context parameters comprised in the received appeal using an artificial intelligence-based predictor model, wherein the plurality of claim predictors comprises a predictor name and predictor type and wherein the artificial intelligence-based predictor model represents the plurality of claim predictors;

creating, by the processor, a dataset for each of the determined plurality of claim predictors based on values of the one or more context parameters;

generating, by the processor, a trained artificial intelligence decisioning model based on an input claim training dataset, pre-stored business rules, pre-stored predictive models and pre-stored adaptive models, wherein the trained artificial intelligence decisioning model is configured to predict claim approval propensities for appeals;

determining, by the processor using the trained artificial intelligence decisioning model, whether the one or more context parameters matches one or more parameters regarding the pre-stored business rules, the pre-stored predictive models and the pre-stored adaptive models;

predicting, by the processor, claim approval propensity for the appeal based on output of the trained artificial intelligence decisioning model, wherein the claim approval propensity represents at least one of: an approval probability score and a rejection probability score for the appeal;

outputting, by the processor, the predicted claim approval propensity for the appeal to a web application for display on a web browser executing on a user device; and generating, by the processor, at least one recommendation message for the predicted claim approval propensity, wherein the recommendation message comprises a recommendation for a medical expert to proceed with real-time clinical decisions based on a positive propensity score.

11. The method of claim 10, further comprises generating an appeal summary for the appeal based on the predicted claim approval propensity, wherein the appeal summary comprises insights derived based on the approval probability score and a rejection probability score for the appeal.

12. The method of claim 10, further comprises
self-learning the trained artificial intelligence decisioning model based on the predicted claim approval propensity; and
auto correcting propensities of approval of the appeal based on the self-learnt artificial intelligence decisioning model.

13. The method of claim 10, further comprises backward tracing of the predicted claim approval propensity for the appeal to determine prediction rationale.

14. The method of claim 10, wherein for predicting approval propensity, the method comprises
determining a deviation in the one or more context parameter if the one or more context parameter fails to match with the at least one of the created dataset and the pre-stored business rules, the pre-stored predictive models and the pre-stored adaptive models;
generating at least one of an approval propensity score and a rejection probability score for the appeal based on the determined deviation; and
predicting the claim approval propensity for the appeal based on output of the trained artificial intelligence decisioning model based on the generated at least one of the approval propensity score and the rejection probability score.

15. The method of claim 10, further comprising presenting the recommendation message at different stages of the appeal.

16. The method of claim 10, wherein the one or more context parameters comprises data representative of at least one of business issue, group, name, direction, channel, procedure code and procedure code type.

17. The method of claim 10, wherein the predictor name related to the plurality of claim predictors comprises medical plan name, medical plan type, medical plan line of balance, medical diagnosis code, medical coinsurance amount, medical procedure approved amount, medical procedure charge amount, co-payment amount, deductible amount and non-covered charges.

18. The method of claim 10, wherein the predictor types related to the plurality of claim predictors comprises symbolic predictor type and numeric predictor type.

19. A non-transitory computer-readable storage medium having instructions stored therein that when executed by a hardware processor, cause the processor to perform method steps comprising:
receiving, by a processor, an appeal from a customer, wherein the appeal comprises one or more context parameters;
determining, by the processor, a plurality of claim predictors corresponding to the one or more context parameters comprised in the received appeal using an artificial intelligence-based predictor model, wherein the plurality of claim predictors comprises a predictor name and predictor type and wherein the artificial intelligence-based predictor model represents the plurality of claim predictors;
creating, by the processor, a dataset for each of the determined plurality of claim predictors based on values of the one or more context parameters;
generating, by the processor, a trained artificial intelligence decisioning model based on an input claim training dataset, pre-stored business rules, pre-stored predictive models and pre-stored adaptive models, wherein the trained artificial intelligence decisioning model is configured to predict claim approval propensities for appeals;
determining, by the processor using the trained artificial intelligence decisioning model, whether the one or more context parameters matches one or more parameters regarding the pre-stored business rules, the pre-stored predictive models and the pre-stored adaptive models;
predicting, by the processor, claim approval propensity for the appeal based on output of the trained artificial intelligence decisioning model, wherein the claim approval propensity represents at least one of: an approval probability score and a rejection probability score for the appeal;
outputting, by the processor, the predicted claim approval propensity for the appeal to a web application for display on a web browser executing on a user device; and
generating, by the processor, at least one recommendation message for the predicted claim approval propensity, wherein the recommendation message comprises a recommendation for a medical expert to proceed with real-time clinical decisions based on a positive propensity score.

* * * * *